Nov. 11, 1952  F. E. GAINES  2,617,698
SEALED WHEEL
Filed March 19, 1949
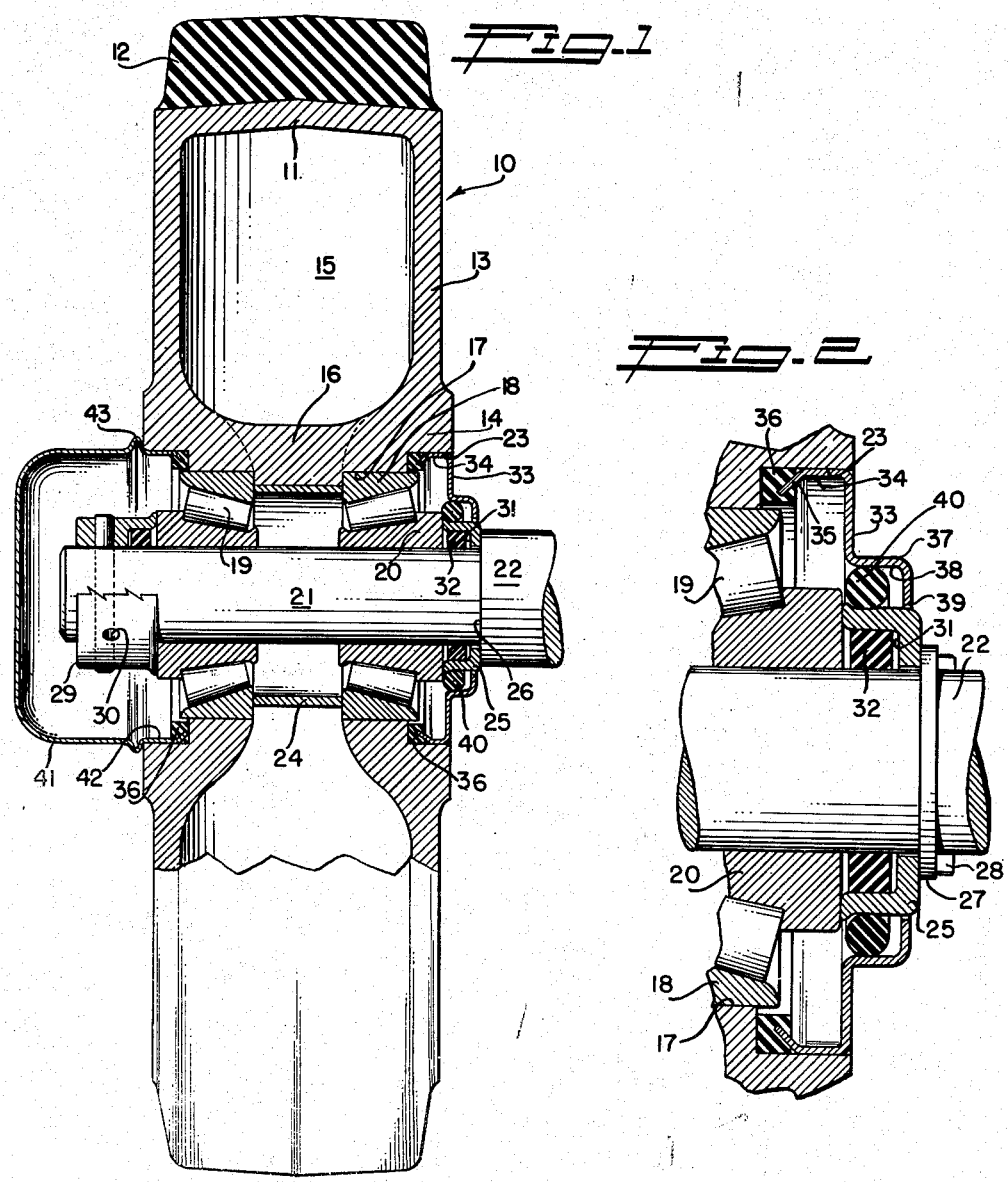
*INVENTOR.*
FRANK E. GAINES
BY
George A. Sullivan
Agent Patented Nov. 11, 1952

2,617,698

UNITED STATES PATENT OFFICE 2,617,698

SEALED WHEEL

Frank E. Gaines, Alhambra, Calif., assignor to Aerol Co., Inc., Burbank, Calif.

Application March 19, 1949, Serial No. 82,339

2 Claims. (Cl. 308—187.1)

This invention relates to bearing seals for wheels of the type used on hand trucks, dolly trucks, and similar vehicles; and forms an improved and simplified design in the nature of a continuation-in-part of my application, Serial No. 44,111, filed August 13, 1948, and bearing the same title; now Patent No. 2,512,148, issued June 20, 1950.

In general, the persent invention relates to providing adequate bearing seals for ball or roller bearing mounted truck wheels subject to frequent high temperature steam sterilization and washing with strong detergents, as in the case where such wheels support food during handling processes such as in meat and dairy processing establishments where the equipment must be sterilized at frequent intervals, such sterilization involving steam sprays and/or washing processes with strong detergents and/or disinfectants, entry of which into the wheel bearings would quickly cut the grease and ruin the bearings themselves.

In my prior mentioned application I have disclosed bearing seals which are relatively expensive to manufacture and install because of the multiple machining and threading operations required in the wheel hubs as well as on the seals themselves. The present invention relates to the substitution of sheet metal stampings which can be readily installed in the wheel hub by pressing into place in simple shouldered recesses provided therein, and when so installed will provide air, water and steam tight joints which do not add appreciable friction, nullifying the advantages obtained with antifriction bearings of the type disclosed.

It is therefore among the objects of the invention to provide a new and improved wheel with a sealed bearing mechanism capable of blocking the infiltration of high pressure hot water and steam together with soaps and detergents.

Another object of the invention is to provide a new and improved wheel sealed on both sides to prevent ingress of moisture in any form and which may be thoroughly packed with grease so that the grease remains completely effective over long periods of time in the face of high pressure sanitary cleaning.

Still another object of the invention is to provide a new and improved wheel construction of simple design and inexpensive construction which is capable of effectively sealing the rolling parts of the bearings against high pressure sanitary cleaning methods.

A further object of the invention is to provide a new and improved wheel structure sufficiently versatile so that the wheel may be used with equal effectiveness whether placed upon the end of a shaft or at a location intermediate the ends.

With these and other objects in view, the invention consists in the construction, arrangement and combination of the various parts of the device whereby the objects contemplated are attained, as hereinafter set forth, pointed out in the appended claims and illustrated in the accompanying drawing.

In the drawing:

Figure 1 is a vertical section through an improved wheel showing inboard and outboard types of bearing seals embodying the features of this invention; and Figure 2 is an enlarged fragmentary detailed section of an inboard type of bearing seal wherein a collar eliminates the need of a turned down section on the wheel axle.

In the embodiment chosen for the purpose of illustration, there is shown a wheel 10, of a type suitable for fixed or castering action on hand trucks and similar vehicles, which may be integrally cast to include a rim 11, carrying a rubber tread 12, side walls 13 being formed integral with the rim 11, and hubs 14, as by coring out the interior space 15 for lightness. As so arranged, the hub sides would be tied together by several webs 16, spaced sufficiently apart to support the interior core during the casting operation from core points extending outwardly from the hubs.

The hubs 14 are bored at 17 to receive the outer races 18 of anti-friction bearings such as roller-bearings 19, the inner races 20 of which are mounted either on a turned down section 21 of a shaft 22 as in Figure 1, or directly on the shaft 22 as in Figure 2. The hub bores 17 are counter-bored at 23 outside the outer race locations to receive sealing means to be later described. If desired, a tubular sleeve 24 may be inserted between the two bearing outer races 17 to close the openings between the webs 16, in order to prevent bearing grease from entering the cored out interior of the wheel.

The two bearings 19 are shown as taper roller-bearings which both develop and resist side loads, as well as carrying the useful load on the wheels. It is accordingly necessary to provide abutments outside of each inner race to absorb such side loads. In Figure 1, I have shown a spacer 25 between the right hand inner bearing race 20 and a shoulder 26 formed by the turned down portion 21 of the shaft 22; whereas in Figure 2, this spacer bears against a collar or washer 27 backed up against a pin 28 through the shaft. In the case of a swiveling wheel, both sides might use such spacers 25; but in the case of a wheel mounted on the end of the shaft as in Figure 1, I prefer to use an elongated collar 29 pinned to the shaft through one of several diametrically disposed pairs of apertures 30 in the collar, which apertures are slightly staggered longitudinally of the collar axis to provide for initial adjustments and take-up of side play in the bearing assembly when the wheel is being mounted. The spacer 25 or collar 29, as the case may be, is provided with an annular recess 31 on the side facing the inner bearing race 17, in which a sealing ring 32 is disposed. The cross-sectional form and material of this ring is not critical since it provides a static gasket-like seal preventing leakage between the shaft and the inner bearing race 20 where no relative motion of the parts is involved. Accordingly, while I prefer to use a compressible packing in endless ring form, various rubber and rubber-like compounds molded in ring form will satisfactorily serve my purpose, although numerous other types of packing or gasket materials are available. Cut lengths of packing of the rope or braided type are also usable, but are less desirable and reliable from a practical standpoint.

The running seal, to be now described, comprises a stepped diameter stamped metal disc like member 33 having a peripheral flange 34 of a diameter matching the counterbore 23 in the hub, the inner edge 35 of the flange being inturned slightly and embedded in a rubber-like gasket ring 36 adapted to bottom in the counterbore to form a static seal between the wheel hub and the disc like member. The member 33 has an annular offset 37 forming an internal annular recess 38, and is centrally apertured at 39, for running clearance with the spacer 25. The internal recess 38 in the disc like member 33 cooperates with the external surface of the spacer 25 to slightly compress an O ring type of rubber-like sealing ring 40 while having sufficient side or longitudinal clearance to provide room for the rolling action of such an O ring under conditions of either wheel side play or positive differential pressures acting either inside or outside of the O ring. Under different conditions of operation the O ring may be stationary on the spacer 25, may rotate with the disc like member 33, or may have some relative motion respective to both, it being immaterial which surface takes the relative motion as the O ring makes a perfect seal in either case while developing a minimum of friction.

The material chosen for the O ring may be selected from numerous rubber and rubber-like compositions in which such rings are now commercially available, the choice depending on lubricant resistance, and temperature ranges. For example, a hand truck equipped with the wheels of this invention might be used in a cold storage warehouse at temperatures below zero, and at intervals brought out into a hot humid room to be sterilized by high pressure jets of live steam, perhaps mixed with or in the presence of strong detergents or disinfectants. In such a case the O ring must be flexible and resilient at the low working temperature and capable of withstanding the steam jet while initially still at such a low temperature. Commercially available O rings have been developed for the Airforce winterization program that will function at temperatures as low as sixty degrees below zero, as well as at temperatures one hundred and sixty degrees above zero.

As in the case of the alternative or conjoint use of the spacer 25 and collar 29, both ends of the hub 14 could be sealed as described above. However, if the wheel is mounted near the end of the shaft 22 as in Figure 1, I prefer to omit the O ring 40 and the disc-like member 33, using instead an enclosing cup-like cap 41 having a peripheral flange 42 like the flange 34, together with the gasket ring 36 previously described. It is convenient to provide a peripheral bead 43 in the cap walls, to facilitate removal of the cap when it is desired to dismount or lubricate the bearings.

The sealed bearing wheels of this invention are particularly useful for severe operating conditions, including in addition to the food handling industries wherein the wheels may be subject to wide ranges of and rapidly changing temperatures and high pressure steam or hot water jets for frequent sterilization; other uses involving extreme temperature changes which would set up breathing or air leakage into or out of the bearing cavity as the wheel is cooled or heated. The really air and moisture tight seal of this invention precludes such breathing, and tests have shown that the seals will retain an interior air pressure of seventy pounds per square inch almost indefinitely.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

I claim:

1. The combination with a rotary member having a chamber extending axially therethrough that is circularly bored to accommodate the outer race of an anti-friction bearing and that is circularly counterbored axially outside the accommodation for said outer race, a shaft which extends axially through said chamber, and an anti-friction bearing the inner race of which is mounted on said shaft and the outer race of which is mounted in said chamber, of means for sealing said bearing and chamber comprising a spacer member carried by said shaft, means for holding said spacer member against axial movement relative to said shaft and relative to the inner race of said bearing, means sealing the spacer member to said shaft, a closure member having an axially-extending offset portion that surrounds said spacer member and that is spaced radially therefrom and that defines with said spacer member an annular recess surrounding said spacer member, said closure member having also a peripheral flange that engages frictionally with the axially-extending wall of the counterbore of said rotary member, said closure member having a centrally-disposed opening therein to receive said shaft and spacer member which is slightly larger in diameter than said spacer member so that said closure member is rotatable relative to said spacer member, flexible resilient sealing means in said annular recess having a cross-sectional thickness measured radially of said shaft at least equal to the radial measurement of said annular recess, and packing means carried by said peripheral flange and engaging both the axially-extending and the radially extending walls of said counterbore, said closure member being a sheet-metal stamping.

2. The combination with a rotary member having a chamber extending axially therethrough that is circularly bored to accommodate the outer race of an anti-friction bearing and that is circularly counterbored axially outside the accommodation for said outer race, a shaft which extends axially through said chamber, and an anti-friction bearing the inner race of which is mounted on said shaft and the outer race of which is mounted in said chamber, of means for sealing said bearing and chamber comprising a spacer member carried by said shaft, means for holding said spacer member against axial movement relative to said shaft and relative to the inner race of said bearing, means sealing the spacer member to said shaft, a closure member having an axially-extending offset portion that surrounds said spacer member and that is spaced radially therefrom and that defines with said spacer member an annular recess surrounding said spacer member, said closure member having also a peripheral flange that engages frictionally with the axially-extending wall of the counterbore of said rotary member, flexible resilient sealing means in said annular recess having a cross-sectional thickness measured radially of said shaft at least equal to the radial measurement of said annular recess, and packing means carried by said peripheral flange and engaging both the axially-extending and the radially extending walls of said counterbore, said closure member being a sheet-metal stamping, and the peripheral flange of said closure member having a radially-inturned edge which is embedded in said packing means and which secures said packing means to said closure member.

FRANK E. GAINES.

REFERENCES CITED

The following references are of record in the file of this patent:

UNITED STATES PATENTS

| Number | Name | Date |
|---|---|---|
| 1,194,917 | Wright | Aug. 15, 1916 |
| 1,784,516 | Fairbanks | Dec. 9, 1930 |
| 1,896,066 | Brown | Feb. 7, 1933 |
| 2,009,281 | Stein | July 23, 1935 |
| 2,512,148 | Gaines | June 20, 1950 |